Oct. 16, 1928.  
T. BROWN  
1,688,034  
LISTER PLOW AND PLANTER  
Original Filed Nov. 13, 1918   3 Sheets-Sheet 1
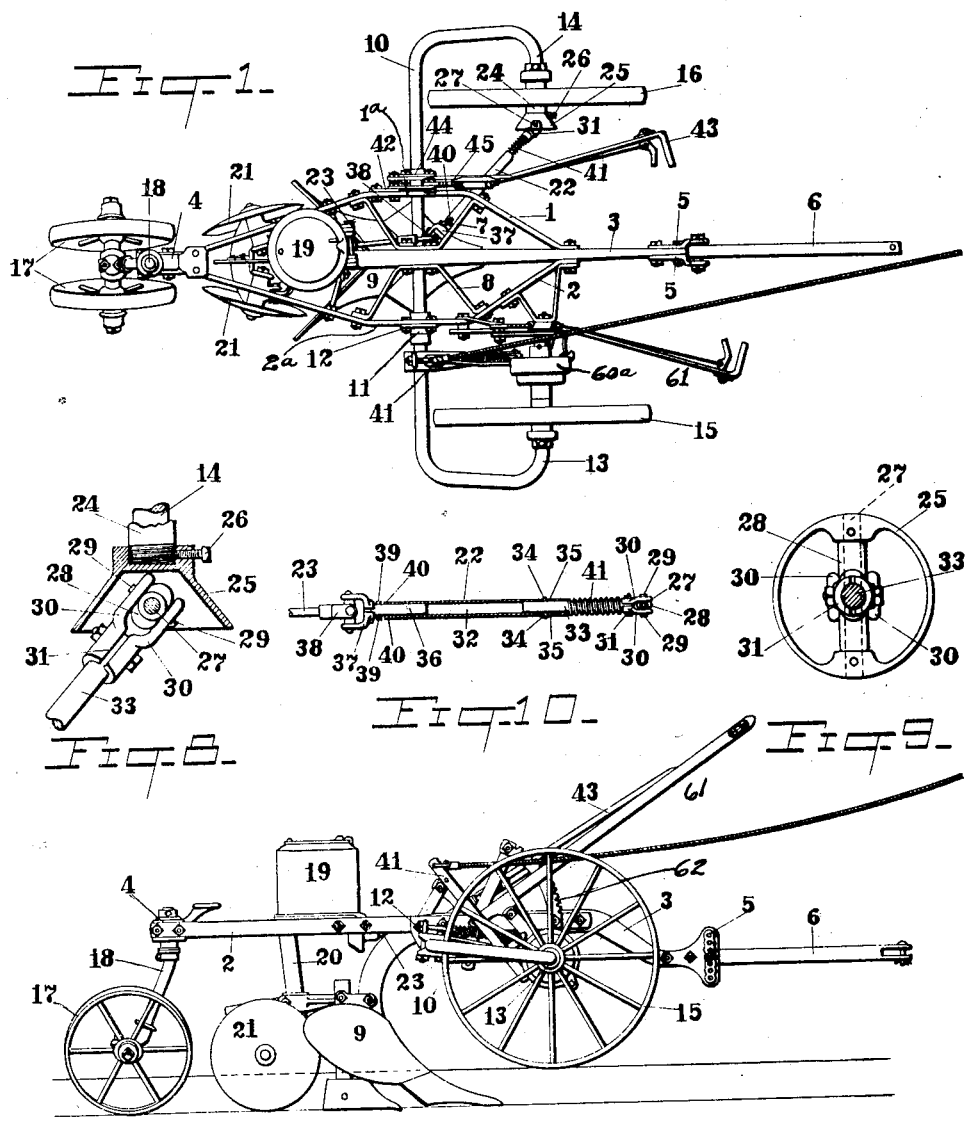

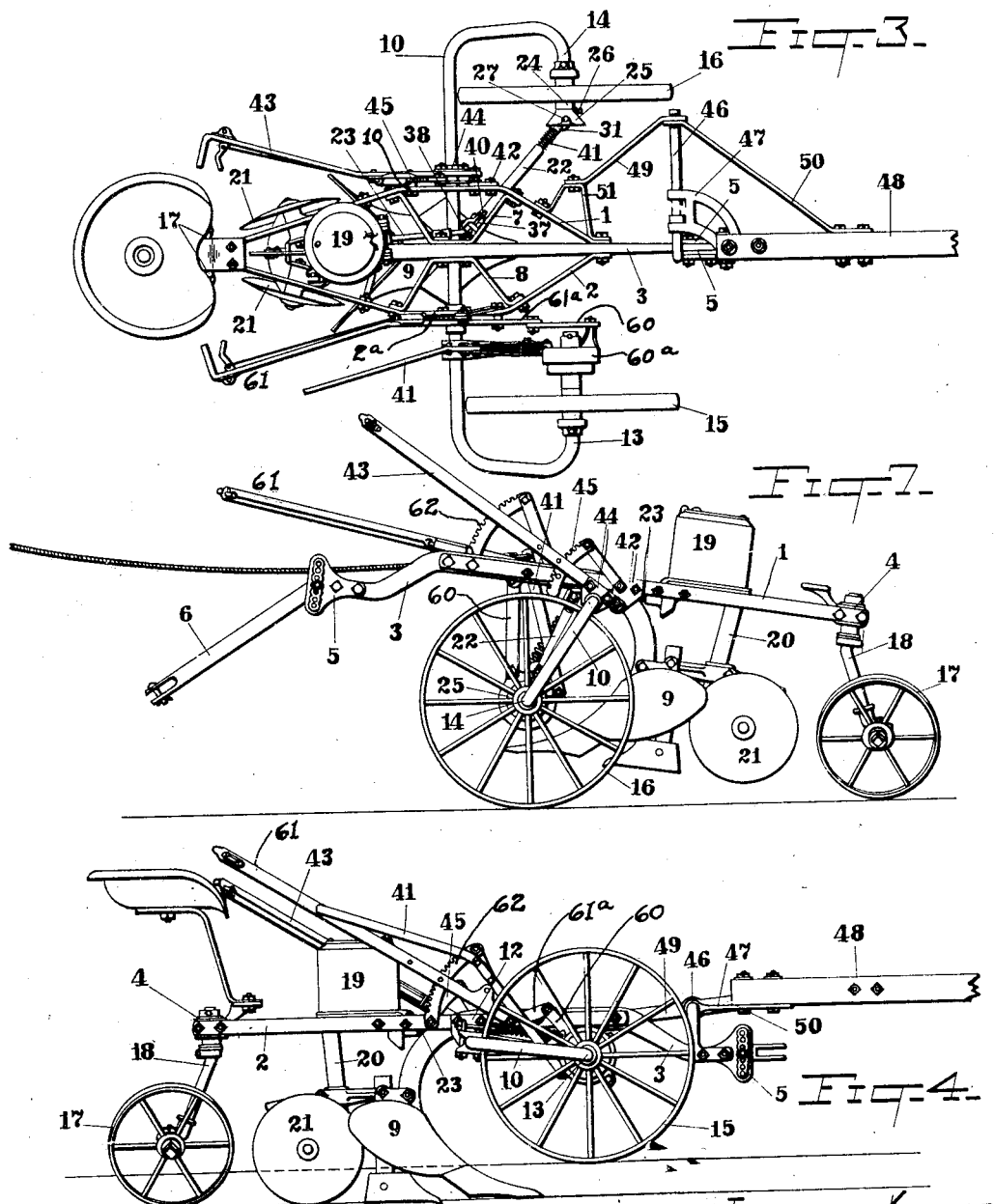

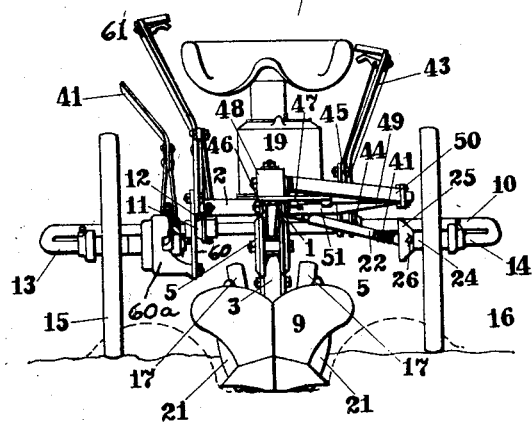

Patented Oct. 16, 1928.

1,688,034

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

LISTER PLOW AND PLANTER.

Application filed November 13, 1918, Serial No. 262,343. Renewed January 28, 1922. Serial No. 532,503.

My invention relates to lister plows and planters, and has for its object to provide a machine of that class, preferably tractor drawn, and adapted to be automatically raised and lowered by traction power from the supporting wheels; and embodying devices by the operation of which the plow is kept in parallel relation with the ground, and the actuation of the planting mechanism is effectively accomplished whether the axis of the supporting wheels is at an angle to the surface or parallel therewith. Other objects will be disclosed in the following specification.

Referring to the drawings in which similar numerals indicate identical parts—

Figure 1 is a plan view of a lister plow and planter embodying my improvements, and showing also a draft device for connecting the machine to a tractor, and the levers projecting forwardly.

Figure 2 is a side elevation of Figure 1 with the plow in operative position.

Figure 3 is a plan view similar to Figure 1 but arranged to be horse drawn and with the levers extended rearwardly.

Figure 4 is a side elevation of Figure 3.

Figure 5 is a front elevation of Figure 4.

Figure 6 is a front elevation similar to Figure 5 but with the axle inclined laterally.

Figure 7 is a side elevation, the opposite of Figure 2 and showing the plow raised.

Figures 8 and 9 are detail views of the connection of the shaft with a wheel to transmit power therefrom to the seeding mechanism, and Figure 10 is a longitudinal section of said shaft.

The main frame is composed of bars 1 and 2 having parallel parts $1^a$, $2^a$ for a portion of their length and converging at their forward ends to a plow beam 3 to which the ends are bolted. The rear end portions of the bars 1 and 2 also converge to a casting 4 to which they are rigidly secured. As shown in Figures 1 and 2 the forward end of the plow beam 3 is bent downwardly and on opposite sides of its termination I secure clevis members 5 to which is connected a draw bar 6 adapted for attachment to a tractor. Centrally the bars 1 and 2 are rigidly connected to the plow beam 3 by braces 7 and 8, and on the rear of the plow beam is properly mounted a lister plow 9.

A crank axle 10 extends transversely of the main frame and is loosely and rockably journaled in a bearing 11 on a bracket 12 rigidly bolted to the part $2^a$ of the bar 2, and is connected to the part $1^a$ of the bar 1 in a manner hereinafter explained. The end portions of the axle 10 are bent at an angle to project downwardly and forwardly, and terminate in spindles 13 and 14 having a common axis and turned inward toward each other and parallel to the main portion of the axle. Supporting wheels 15 and 16 are mounted on the spindles 13 and 14. The rear of the machine has supporting wheels 17 mounted by means of a spindle 18 journaled rotatably in a bearing in the casting 4.

The seeding mechanism is of a well known type and includes a seed hopper 19 rigidly supported on the frame and having a discharge pipe 20 extending downwardly between covering wheels 21 which are suitably supported from the plow beam 3. The seeder is operated by the traction power of one of the supporting wheels, preferably wheel 16, through a shaft 22 connected therewith and to the shaft 23 of the seeder in the following manner; the inner end of the hub 24 of the wheel 16 is threaded to receive a shield in the form of a funnel shaped member 25 which is securely held in place by a set screw 26. Pivotally mounted within the member 25 on a bolt or pin 27 secured diametrically across the member 25, is a sleeve 28 having centrally opposite flattened sides with studs 29 thereon on which are pivoted arms 30 of the bifurcated end of a split sleeve 31. The shaft 22 is composed of a tubular part 32 within one end of which is held a part 33 connected rigidly to the sleeve 31. The rotary movement of the part 33 is transmitted to the tubular part 32 by studs 34 on the part 33 and projecting through opposite slots 35 in the tubular part 32; the opposite end of the tubular part 32 receives a portion of a part 36 on the outer end of which is rigidly clamped a member 37 of a universal joint the second member 38 thereof being rigidly secured on the shaft 23 of the seeding device. Studs 39 on the part 36 are adapted to engage with notches 40 on the adjacent end of the tubular part 32. A coiled spring 41 is carried on the part 33 between the sleeve 31 and the tubular part 32. It will be noted that the shafts 22 and 23 are disposed angularly relatively to each other, and to bring the seeding mechanism into operation I have made the connection of the shaft 22 with the shaft 23 forward of the axis of the crank axle 10; consequently when the crank axle 10 is swung to lower the plow by relative forward movement of the supporting wheels 15 and 16, the shaft 22 is shortened by longitudinal movement of its parts 32 and 36, and the studs 39 are engaged with the notches 40 in the tubular part 32; the tension of the spring 41 preventing a disengagement until the plow is raised out of operation entirely. In raising the plow the shaft 22 is lengthened by outward movement of the part 36 with respect to the part 32, and by contact of the studs 34 with the outer ends of the slots 35 the tubular part 32 is disengaged from the studs 39 making the seeder inoperative.

The slots 35 are of sufficient length to permit a limited play of the studs 34 therein, so that the seeding mechanism will be operative during any adjustment of the plow to regulate the depth of work. From the foregoing description it will be seen that the shafts 22 and 23 transmit a drive from the ground wheel 16 to the seeding mechanism. It will also be apparent that the drive transmitted through these shafts is controlled by the engaging and releasing of the clutch parts 39—40. Such clutch parts are engaged and released by the shortening and lengthening of the extensible shaft 22, which, in turn, is effected by relative angular movement between the shafts 22 and 23, consequent upon the lowering or raising of the implement frame. This lowering or raising of the frame, with the resultant relative angular movement between the shafts, causes the extensible shaft 22 to shorten or lengthen owing to the fact that the rear end of said shaft does not pivot about a center concentric with the pivotal axis of the crank axle 10, but instead pivots about a center which is disposed forwardly of the axle 10, as hereinbefore described. Attention is also directed to the fact that the shaft member 33 is directly and permanently connected with the hub of the wheel 16 by the connection of the universal coupling to the funnel shaped shield 25, so that such universal coupling is well protected from the dirt that is carried up by the rim of the wheel and falls off the upper portion thereof. The funnel shape of the shield not only deflects the dirt away from the universal coupling, but also provides for the angular disposition of the shaft member 33 with relation to the axis of said wheel.

The wheel 15 and spindle 13 are provided with a clutch mechanism one part of which is rigidly connected to the wheel 15, and the second part is loose on the spindle 13 and connected with the frame, both parts adapted to be engaged by actuation of a tripping lever 41 so that the traction power of the wheel 15 is utilized to rock the axle to raise the plow out of operation, any one of several types of clutches may be used for this purpose and I do not limit myself to the type shown.

The interior parts and various details of the clutch indicated conventionally in the drawings are well known and do not require detailed description. Here it is sufficient to note that the intermittently driven part 60ᵃ of the clutch transmits lifting power to the beam through a link 60. As shown, the upper end of the link is pivotally connected to the short arm 61ᵃ of a hand lever 61 pivoted to the frame and associated with a rack segment 62 for locking the lever at any selected angulation. The lever is pivoted to the beam frame at points near the bearing 11.

The axle 10 is sufficiently loose in the bearing 11 to permit of a limited transverse rocking movement with relation to the frame, or in other words to permit the frame to rock about a longitudinal axis relative to the axle, the latter rocking being controlled by the operator in order to keep the frame level or parallel with the surface. For this latter purpose I secure rigidly on the bar 1 a downwardly extending support 42 to which is pivotally secured a lever 43; a member 44 extends forwardly from the pivoted end of the lever 43 and is provided with a bearing in which the axle 10 is rockably journaled. Preferably I make the member 44 separate from the lever 43 and secure it thereto by suitable bolts or rivets, but it is obvious that it can be integral with the lever. Mounted on the bar 1 is a segmental rack 45 with which a latch, of the usual type, on the lever 43 is adapted to engage. It will be readily apparent that by actuation of the lever 43 with its fulcrum on the axle, the plow and attached seeding device can be kept level with relation to the ground.

When the clutch is tripped so as to release the plow and seeding mechanism for operation, the axle 10 rocks clockwise from the position shown in Fig. 7, and the driving connection comprising the shafts 22 and 23 is shortened automatically causing the notches in the part 32 thereof to engage with the studs on the part 36 so that power is transmitted from the wheel 16 to the shaft 23 to operate the seeding mechanism. When the axle 10 is rocked in the opposite direction to raise the plow the shaft 22 will be lengthened and the parts 32 and 36 disengage automatically to stop the operation of the seeding mechanism.

As it is intended that my machine may be also horse drawn, I have provided an attachment which can be readily secured on the machine and on which a draft pole or tongue is supported. This attachment comprises a support 46 having an end portion bent downwardly and rigidly secured to the beam 3. The support 46 extends laterally and on it is pivotally mounted a bracket 47 to which a draft tongue 48 is bolted. The opposite end of the support 46 is secured to braces 49 and 50, the latter extending to the tongue 48 to which it is secured; the brace 49 extends rearwardly and is secured to a bracket 51 mounted on the frame bar 1.

When the machine is changed to horse power, I provide a seat for the driver, as shown, and reverse the levers so as to bring them within easy reach from the seat.

Under many conditions of ground surface the two wheels 15 and 16 run in different horizontal planes, and if the wheel-carrying system is rigid with the beam and the tools carried thereby the latter will be thrown out of their true level working position when the wheels are at different levels.

With the present construction the wheel 16 and its immediately connected parts can, by the lever 43 and the vertically movable bearing, be positioned to run in a horizontal plane other than that of the wheel 15, without the established leveling adjustment of the beam and tools being affected when the power lift mechanism operates to raise or lower the plow. And the operator can swing or tilt the wheel system as he finds desirable, and then lock it in position after adjustment. This tilting movement takes place around an axial line at the bearing 11, and here the wheel-carrying shaft 10 is connected to the beam frame in such way that all of the parts adjacent to the bearing are held practically fixed, vertically, in relation to each other.

This arrangement of parts provides for transmitting uniformly, during all lifting efforts, the automatically generated power which is utilized for lifting the beam. The link 60 transmits the lifting power to this part of the structure, and the same operative relationships between the movable wheel 15, the clutch, the link 60 and the beam frame are maintained on all occasions of exertion of lifting effort; and irrespective of the relative positions of the two wheels. Whether the wheel 16 be traveling on a relatively high line or on a relatively low one, the automatic lifter is always in proper relationship for lifting the tools from the position in Fig. 2 to the position in Fig. 7.

What I claim is—

1. An agricultural machine having in combination, a frame, an axle rockably journaled on the frame and having both end portions projecting downwardly and provided at their terminations with inwardly extending spindles, supporting wheels mounted on said spindles, a seeding mechanism carried on the frame, means to operate the seeding mechanism by the traction power of one of said wheels, and means operable at will to rock said axle and raise the frame by the traction power of the opposite wheel.

2. An agricultural machine having in combination, a frame, an axle rockably journaled on the frame and having both end portions projecting downwardly and provided at their terminations with inwardly extending spindles, supporting wheels mounted on said spindles, a seeding mechanism carried on the frame, a shaft connection from one wheel hub to the seeding mechanism whereby the latter is operated by the traction power of the wheel, and means operable at will to rock said axle and raise the frame by the traction power of the opposite wheel.

3. An agricultural implement having in combination a frame, an axle journaled on the frame to turn about a transverse axis and having both end portions projecting downwardly and provided with wheel spindles, said frame being adapted to rock about a longitudinal axis relatively to said axle, supporting wheels mounted on said spindles, seeding mechanism carried by the frame, a driving connection between one of said wheels and the seeding mechanism whereby the latter may be operated by the traction power of said wheel, and means operable at will by the traction power of one of said wheels to turn said axle about a tranverse axis to raise the frame.

4. An agricultural machine having in combination, a frame, an axle journaled in a bearing on one side of the frame and adapted to turn about a transverse axis to raise and lower the frame, and to be rocked transversely relatively to the frame, said axle having both end portions projecting downwardly and provided at their terminations with spindles, supporting wheels mounted on said spindles, a seeding mechanism carried on the frame, a connection from one wheel hub to the seeding mechanism whereby the latter is operated by the traction power of the wheel when the frame is lowered and disconnected therefrom when the frame is raised to its limit, and means to adjust the frame about a longitudinal axis to preserve its parallelism with the ground while the seeding mechanism is in operation.

5. An agricultural machine having in combination a frame, an axle rockably journaled on the frame, supporting wheels on said axle, a seeding mechanism mounted on the frame, means to operate the seeding mechanism by traction power of one of said wheels, and means to adjust the frame about a longitudinal axis to preserve its parallelism with the ground while the seeding mechanism is in operation.

6. An agricultural machine having in combination a frame, an axle journaled in a bearing on one side of the frame and adapted to be rocked about a transverse axis to raise and lower the frame, means for rocking the frame on said axle about a longitudinal axis, said axle having both end portions projecting downwardly and provided at their terminations with spindles, supporting wheels mounted on said spindles, a seeding mechanism carried on the frame, a pair of angularly disposed shafts interposed between one wheel hub and the seeding mechanism, and clutch mechanism associated with said shafts, and controlled by the raising and lowering of the frame to form a driving connection between the seeding mechanism and said wheel when the frame is lowered and to break such driving connection when the frame is raised to its limit.

7. An agricultural implement having in combination a frame, cranks at opposite sides thereof adapted to rock about a transverse axis to raise or lower the frame, said cranks having wheel spindles, wheels mounted on said spindles, seeding mechanism carried by the frame, and flexible means for driving the seeding mechanism from one of said wheels, said means comprising a shaft member driven by and mounted to swing with the spindle of the latter wheel, a shaft member mounted on the frame and operatively connected with the seeding mechanism, and means operated by the rocking of the axle for making or breaking a driving connection between said shaft members.

8. An agricultural implement having in combination a frame, an axle rockably journaled on the frame and having a downturned end portion provided at its termination with an inwardly extending wheel spindle, a supporting wheel mounted on said spindle, a seeding mechanism carried on the frame, and means for operating the seeding mechanism by the traction power of said wheel.

9. An agricultural implement having in combination a frame, a crank axle journaled on the frame to rock about a transverse axis, supporting wheels on said axle, seeding mechanism mounted on the frame and adapted to be driven by power from one of said wheels, means actuated by the swinging of said axle for operatively connecting said seeding mechanism with or disconnecting it from such wheel, and means for adjusting the frame about a longitudinal axis to preserve its parallelism with the ground when the seeding mechanism is in operation.

10. An agricultural implement having in combination a frame, an axle rockably journaled on the frame and having a downturned end portion provided at its termination with a wheel spindle, a supporting wheel mounted on said spindle, seeding mechanism carried on the frame, means connected with and driven by said wheel for operating the seeding mechanism, said means comprising shaft members disposed angularly relatively to each other, one of said shaft members being arranged to be lengthened or shortened by the rocking of the axle, and means operated by variation in the length of said shaft member for controlling the operation of the seeding mechanism.

11. An agricultural implement having in combination a frame, an axle rockably journaled on the frame and having a downturned end portion provided at its termination with an inwardly extending wheel spindle, a supporting wheel mounted on said spindle, seeding mechanism carried on the frame, and a flexible connection between the hub of said wheel and the seeding mechanism for driving the latter from said wheel.

12. An agricultural implement having in combination a frame, an axle rockably journaled on the frame and having a downturned end portion provided at its termination with an inwardly extending wheel spindle, a supporting wheel mounted on said spindle, seeding mechanism carried on the frame, and a flexible connection between the hub of said wheel and the seeding mechanism for driving the latter from said wheel, said flexible connection comprising a shaft permanently connected with said hub by a universal joint.

13. An agricultural machine having in combination a frame, an axle rockably journaled on the frame, supporting wheels on said axle, seeding mechanism carried on the frame, a shaft connected with said seeding mechanism and extending forward of the axle journal, an extensible shaft disposed at an angle to said first mentioned shaft, a universal joint connecting one end of said extensible shaft with the hub of one of the supporting wheels, a universal joint connecting said shafts together, and clutch mechanism associated with said extensible shaft and actuated by shortening or lengthening thereof for controlling the transmission of power through said latter shaft, said extensible shaft swinging upwardly and downwardly with the rocking movement of said axle, the rear end of said extensible shaft having pivotal movement about a center which is disposed eccentrically with respect to the axis of rocking movement of said axle, whereby said extensible shaft is caused to shorten or lengthen in such swinging movement for engaging or releasing said clutch.

14. An agricultural implement having in combination a frame, an axle rockably journaled on the frame and having a downturned end portion provided at its termination with a wheel spindle, a supporting wheel mounted on said spindle, seeding mechanism carried on the frame, a shaft mounted on said frame and operatively connected with said seeding mechanism, a secondary shaft driven by and mounted to swing with the spindle of said supporting wheel, a universal joint pivotally connecting said shafts together for relative swinging movement, and clutch mechanism interposed between said shafts for controlling the transmission of driving rotation through said shafts, said shafts being so connected with said frame and with said wheel that rocking of the axle will make or break the driving connection between said shafts.

THEOPHILUS BROWN.